US009480086B2

(12) United States Patent
Lanfranchi et al.

(10) Patent No.: US 9,480,086 B2
(45) Date of Patent: *Oct. 25, 2016

(54) MANAGEMENT OF MOBILE DEVICES LEVERAGING LOCATION BASED COOPERATION

(71) Applicant: INTERNATIONAL BUSINESS MACHINES CORPORATION, Armonk, NY (US)

(72) Inventors: Giovanni Lanfranchi, Rome (IT); Scot Maclellan, Rome (IT); Claudio Marinelli, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 13/909,471

(22) Filed: Jun. 4, 2013

(65) Prior Publication Data

US 2013/0346548 A1 Dec. 26, 2013

(30) Foreign Application Priority Data

Jun. 26, 2012 (GB) .................................. 1211279.3

(51) Int. Cl.
*H04W 76/00* (2009.01)
*H04L 29/08* (2006.01)
(Continued)

(52) U.S. Cl.
CPC ........ *H04W 76/002* (2013.01); *H04L 41/0846* (2013.01); *H04L 67/04* (2013.01);
(Continued)

(58) Field of Classification Search
None
See application file for complete search history.

(56) References Cited

U.S. PATENT DOCUMENTS 7,676,573 B2  3/2010  Herzog et al.
7,987,471 B2  7/2011  Herzog et al.
(Continued)

FOREIGN PATENT DOCUMENTS

EP  2320624  11/2011
EP  2445149  4/2012
(Continued)

OTHER PUBLICATIONS

Androutsellis-Theotokis, Stephanos, and Diomidis Spinellis. "A survey of peer-to-peer content distribution technologies." ACM Computing Surveys (CSUR) 36.4 (2004): 335-371.*

(Continued)

*Primary Examiner* — Scott B Christensen
*Assistant Examiner* — Sean Concannon
(74) *Attorney, Agent, or Firm* — Yee & Associates, P.C.; Richard A. Wilhelm

(57) ABSTRACT

A solution is proposed for managing a plurality of data processing mobile devices. A corresponding system is configured for downloading management data onto each one of the mobile devices for application thereof on the mobile device, wherein for at least a first one of the mobile devices the management data is downloaded from a data processing central system, each mobile device wherein the management data has already been downloaded defining an inclusive mobile device; in the solution according to an embodiment of the invention, the step of downloading management data comprises electing a set of inclusive mobile devices temporarily as service mobile devices according to characteristic information of the inclusive mobile devices being based at least on a current position thereof, and causing at least a second one of the mobile devices to download the management data from a selected one of the service mobile devices in proximity thereof.

21 Claims, 8 Drawing Sheets

(51) Int. Cl.
*H04L 12/24* (2006.01)
*H04W 4/00* (2009.01)
*H04W 4/02* (2009.01)
*H04W 64/00* (2009.01)
*H04W 84/18* (2009.01)

(52) U.S. Cl.
CPC .............. *H04L 67/06* (2013.01); *H04L 67/10* (2013.01); *H04L 67/1076* (2013.01); *H04L 67/34* (2013.01); *H04W 4/001* (2013.01); *H04W 4/023* (2013.01); *H04W 64/00* (2013.01); *H04W 84/18* (2013.01)

(56) References Cited

U.S. PATENT DOCUMENTS

| | | | |
|---|---|---|---|
| 8,010,842 | B2 | 8/2011 | Krivopaltsev et al. |
| 2005/0094574 | A1* | 5/2005 | Han et al. .................. 370/254 |
| 2005/0220045 | A1 | 10/2005 | Lin |
| 2005/0278411 | A1 | 12/2005 | Nasu et al. |
| 2006/0003775 | A1* | 1/2006 | Bull .................. G01S 5/0205 455/456.1 |
| 2006/0218395 | A1* | 9/2006 | Maes ................. H04M 15/00 713/167 |
| 2008/0086731 | A1 | 4/2008 | Trossman et al. |
| 2009/0044185 | A1 | 2/2009 | Krivopaltsev |
| 2009/0049166 | A1 | 2/2009 | Roman et al. |
| 2009/0059795 | A1* | 3/2009 | Fonseca et al. ............. 370/236 |
| 2009/0092112 | A1* | 4/2009 | Kim et al. .................. 370/338 |
| 2009/0280795 | A1* | 11/2009 | O'Shaughnessy ........... 455/419 |
| 2009/0300215 | A1* | 12/2009 | Gnanasambandam H04L 67/104 709/242 |
| 2009/0318124 | A1 | 12/2009 | Haughn |
| 2010/0037321 | A1* | 2/2010 | Oz ..................... G06F 21/57 726/24 |
| 2010/0162036 | A1* | 6/2010 | Linden et al. .................. 714/4 |
| 2010/0223320 | A1* | 9/2010 | Huang et al. ................. 709/203 |
| 2010/0274614 | A1 | 10/2010 | Fraley et al. |
| 2010/0299376 | A1 | 11/2010 | Batchu et al. |
| 2011/0055247 | A1* | 3/2011 | Blumberg ........... G06F 17/3087 707/769 |
| 2011/0055546 | A1 | 3/2011 | Klassen et al. |
| 2011/0106886 | A1* | 5/2011 | Nolterieke ................ G06F 8/65 709/204 |
| 2011/0191187 | A1* | 8/2011 | Charbit et al. ............. 705/14.64 |
| 2012/0136949 | A1* | 5/2012 | Virani et al. .................. 709/206 |
| 2012/0173665 | A1* | 7/2012 | Oh .................... H04N 21/25833 709/217 |
| 2012/0218907 | A1* | 8/2012 | Chen ............................ 370/252 |
| 2012/0311655 | A1* | 12/2012 | Hohlfeld ............... G06F 21/105 726/1 |
| 2012/0317254 | A1* | 12/2012 | Chekhanovskiy .. H04L 61/1511 709/222 |
| 2013/0100942 | A1* | 4/2013 | Rudnick et al. .............. 370/337 |

FOREIGN PATENT DOCUMENTS

| | | |
|---|---|---|
| WO | 2005/086458 | 9/2005 |
| WO | 2012/114160 | 8/2012 |

OTHER PUBLICATIONS

Yang, Beverly, and Hector Garcia-Molina. "Designing a super-peer network." Data Engineering, 2003. Proceedings. 19th International Conference on. IEEE, 2003.*

Mastroianni, Carlo, Domenico Talia, and Oreste Verta. "A super-peer model for resource discovery services in large-scale grids." Future Generation Computer Systems 21.8 (2005): 1235-1248.*

Chan, Haowen, and Adrian Perrig. "ACE: An emergent algorithm for highly uniform cluster formation." Wireless Sensor Networks. Springer Berlin Heidelberg, 2004. 154-171.*

Lanfranchi et al., "Management of Mobile Devices Leveraging Location Based Cooperation," U.S. Appl. No. 14/487,454, filed Sep. 16, 2014, 32 pages.

Li et al., "Model of Wireless Telecommunications Network Infrastructure Sharing & Benefit-Cost Analysis", Information Management, Innovation Management and Industrial Engineering, vol. 2, Nov. 2011, pp. 102-105, (Abstract Only).

Lakshman et al., "Enhancing Enterprise Field Productivity via Cross Platform Mobile Cloud Apps", Jun. 2011, pp. 27-32.

Shin et al., "Design and Implementation of the Management Agent for Mobile Devices based on OMA DM", Proceeding ICUIMC '08 Proceedings of the 2nd Intl Conference on Ubiquitous Information Management and Communication, 2008, 6 pages.

Office Action, dated Aug. 3, 2015, regarding U.S. Appl. No. 14/487,454, 27 pages.

Final Office Action, dated Feb. 1, 2016, regarding U.S. Appl. No. 14/487,454, 35 pages.

Notice of Allowance, dated Jul. 11, 2016, regarding U.S. Appl. No. 14/487,454, 20 pages.

* cited by examiner

MANAGEMENT OF MOBILE DEVICES LEVERAGING LOCATION BASED COOPERATION

TECHNICAL FIELD

The solution according to one or more embodiments of the present invention relates to the data processing field. More specifically, this solution relates to the management of data processing mobile devices.

BACKGROUND ART

Mobile devices have become more and more popular in recent years, especially thanks to the widespread diffusion of smart-phones and tablets. The mobile devices make many data processing activities substantially ubiquitous, since they may be used almost everywhere; particularly, users of these mobile devices may access the Internet while around (provided that an access thereto is available, for example, over a mobile telephone connection or a Wi-Fi connection).

The mobile devices may also cooperate among themselves locally, in a peer-to-peer way. For example, US-A-2010/0274614 (the entire disclosure of which is herein incorporated by reference) describes an event scheduling system that is implemented among mobile devices. Moreover, US-A-2005/0220045 (the entire disclosure of which is herein incorporated by reference) describes an instant messaging system wherein the mobile devices exchange instant messages directly, without any back-end messaging server.

Moreover, the mobile devices may be subject to typical actions that normally involve conventional (data processing) devices—such as desktop computers. For example, US-A-2011/0055546 (the entire disclosure of which is herein incorporated by reference) describes a monitoring system that controls available features on the mobile devices.

Particularly, nowadays the mobile devices have a processing power comparable to the one of the conventional devices. Therefore, many mobile devices are provided with a mobile operating system (such as Android by Google Inc., Symbian OS by Nokia Corp., Windows Mobile OS by Microsoft Corp. or iOS by Apple Inc.—trademarks), which combine the features of traditional operating systems with additional features specific for the mobile devices (such as cellular, GPS, and video-camera features). Moreover, the mobile devices may run a large number of software applications on top of their mobile operating systems, such as utilities (like a browser or a media player) and application programs, or apps (like a word-processor or a spread-sheet).

However, this involves the need to cope with typical management activities of the traditional devices—for example, installing, removing, upgrading and maintaining software programs (i.e., operating system and application programs), implementing security rules, and the like. This need is particularly perceived in case of mobile devices belonging to an enterprise, which requires consistent management of all its mobile devices.

For this purpose, conventional resource management tools might be used to manage the mobile devices as well—such as the IBM Tivoli Configuration Manager (ITCM) by IBM Corp. (trademarks). These resource management tools allow enforcing desired management actions on multiple endpoints (i.e., conventional devices or mobile devices) from a central management server. The resource management tools are generally based on an ad-hoc deployment infrastructure that optimizes the deployment of the required management data on the different endpoints (for example, with relays for distributing it and depots for caching it in proximity of the endpoints). Moreover, US-A-2008/0086731 (the entire disclosure of which is herein incorporated by reference) describes a resource management system, wherein data processing resources available in a data center are managed dynamically to maintain expected service levels (according to performance measurements used to predict demand levels).

However, the application of the above mentioned techniques designed for the conventional devices to the mobile devices raises specific problems. Particularly, the number of mobile devices to be managed (for example, in an enterprise) is generally very high. This causes scalability issues in the resource management tools, since the number of mobile devices to be managed may be 1 or 2 orders of magnitude larger than the one for which the management tools have been designed (generally at most 100,000 today).

Moreover, the nomadic behavior of the mobile devices makes it very difficult to organize an efficient deployment infrastructure (since the position of the mobile devices is changing continuously and it is substantially unpredictable).

SUMMARY

In its general terms, the solution according to one or more embodiments of the present invention is based on the idea of leveraging the mobile devices themselves for managing other mobile devices.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for managing a plurality of data processing mobile devices, wherein a set of inclusive mobile devices (wherein management data has already been downloaded) is elected temporarily as service mobile devices according to at least a current position thereof, so as to cause at least another mobile device to download the management data from a selected one of the service mobile devices in proximity thereof.

Another aspect of the solution according to an embodiment of the invention provides a computer program for performing this method.

Another aspect of the solution according to an embodiment of the invention provides a corresponding system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DESCRIPTION OF EMBODIMENTS

Figure 1:
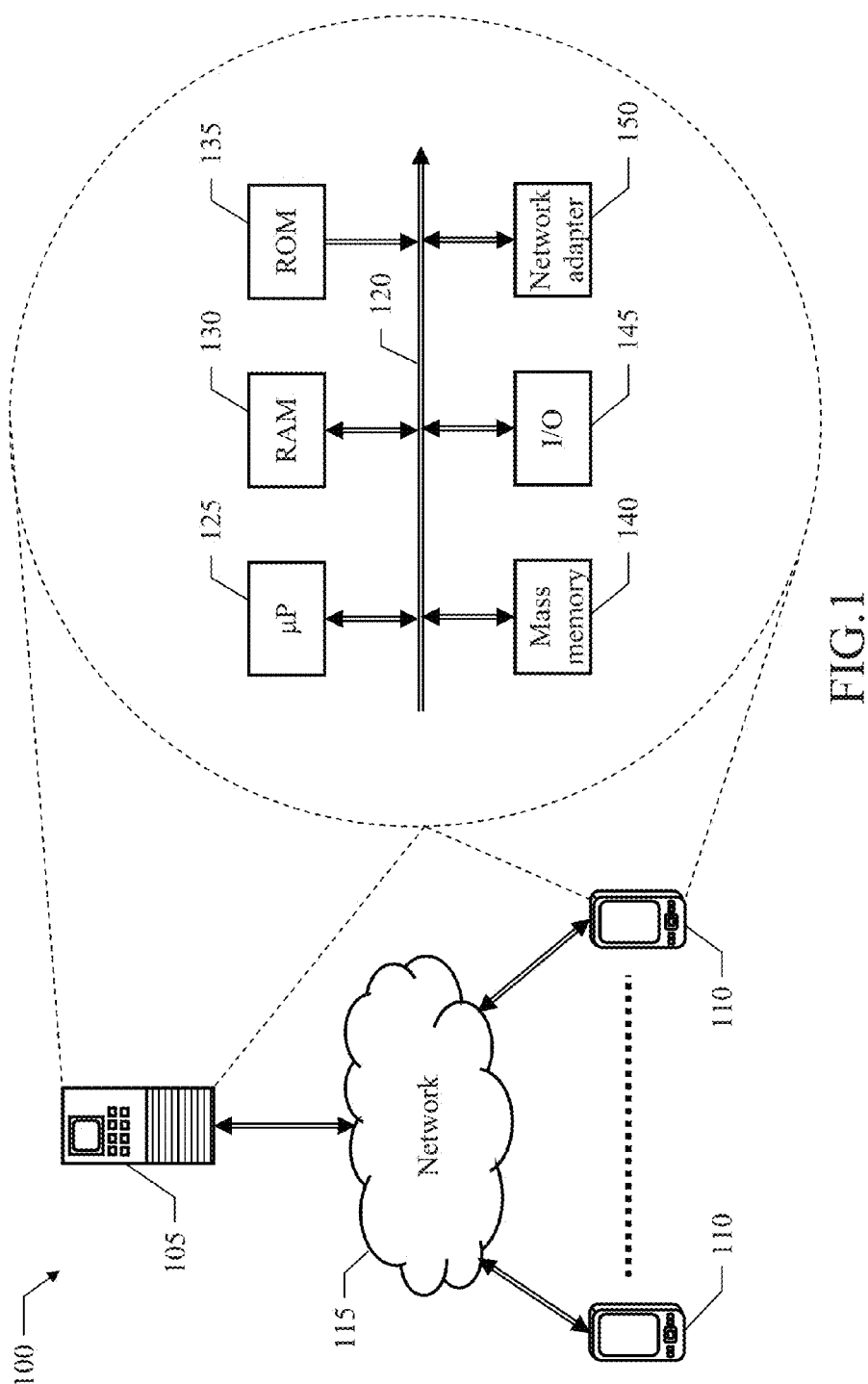
FIG. 1 shows a schematic block diagram of a data processing system wherein the solution according to an embodiment of the invention may be applied.

With reference in particular to the FIG. 1, a schematic block diagram is shown of a data processing system 100 wherein the solution according to an embodiment of the invention may be applied.

The data processing system 100 has a distributed architecture, with one or more servers 105 (only one shown in the figure) and a plurality of endpoints 110 that communicate among them through a network 115.

Particularly, the server 105 is a management server that controls the management of the endpoints 110; typically, the server 105 accesses the network 115 over a wired connection to an access provider (not shown in the figure) that provides access to the Internet.

The endpoints 110 are instead (data processing) mobile devices, which are adapted to be used while moving; for this purpose, the mobile devices 110 are supplied by batteries, and they are quite small and light. Typical examples of the mobile devices 110 are tablets, smart-phones, net-books, pervasive apparatus, and the like. The mobile devices 110 access the network 115 over wireless connections, which may be used to communicate with both the server 105 and the other mobile devices 110; for example, cellular telephone connections or Wi-Fi connections may be used to access the Internet, whereas the same Wi-Fi connections or Bluetooth connections may be used to communicate locally.

A generic computer of the data processing system 100 (i.e., the management server 105 and each mobile device 110) comprises several units that are connected in parallel to one or more communication buses 120 (with a structure that is suitably scaled according to the actual function of the computer 105,110). In detail, one or more microprocessors (I/O) 125 control operation of the computer 105,110; a RAM 130 is used as a working memory by the microprocessors 125, and a ROM 135 stores basic code for a bootstrap of the computer 105,110. The computer 105,110 also has a mass-memory 140 (for example, a hard-disk and a drive for reading/writing optical disks in the server 105, or a flash memory in the mobile devices 110) and input/output (I/O) units 145 (for example, a keyboard, a mouse and a monitor in the server 105, or a touch-screen in the mobile devices 110). A network adapter 150 is used to connect the computer 105,110 to the network 115 (for example, an Ethernet NIC in the server 105, or a telephone transceiver, a Wi-Fi WNIC and a Bluetooth WNIC in the mobile devices 110).

An exemplary scenario of application of the solution according to an embodiment of the invention is shown in the FIG. 2A-FIG. 2F.

Figure 2A:
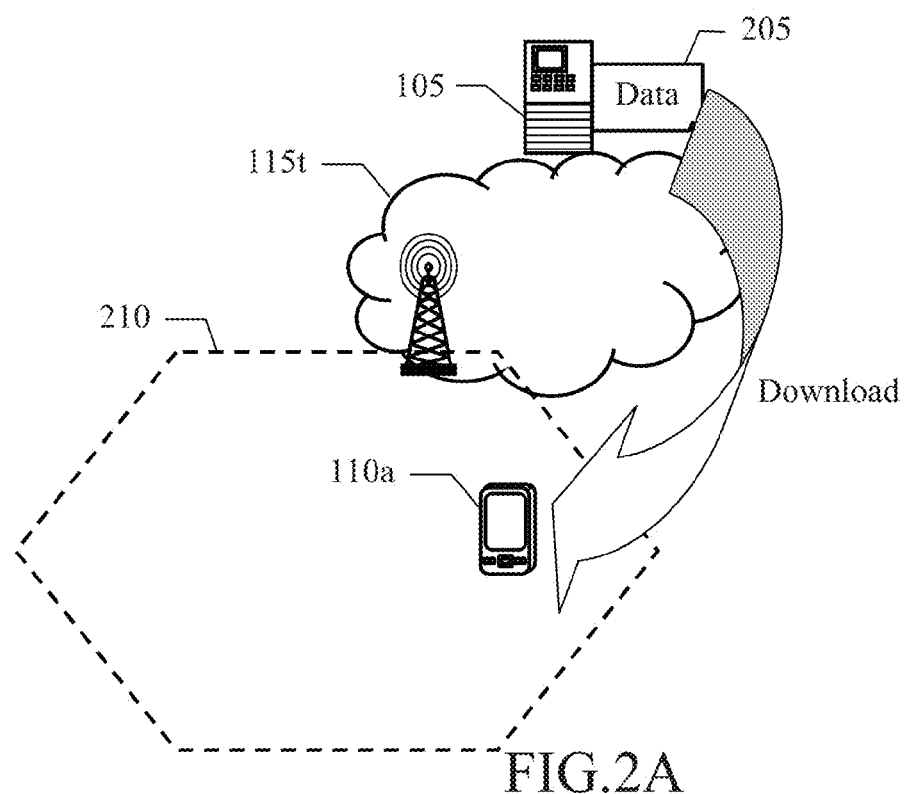
FIG. 2A-FIG. 2F show an exemplary scenario of application of the solution according to an embodiment of the invention.

Starting from the FIG. 2A, a generic mobile device (differentiated with the reference 110a) engages the server 105 for downloading management data 205 to be applied thereon (such as a software patch)—for example, through a telephone network (differentiated with the reference 115t) comprising a (mobile) telephone cell 210 which the mobile device 110a is attached to. In response thereto, the management data is downloaded from the server 105 onto the mobile device 110a as usual, through the telephone network 115t.

Figure 2B:
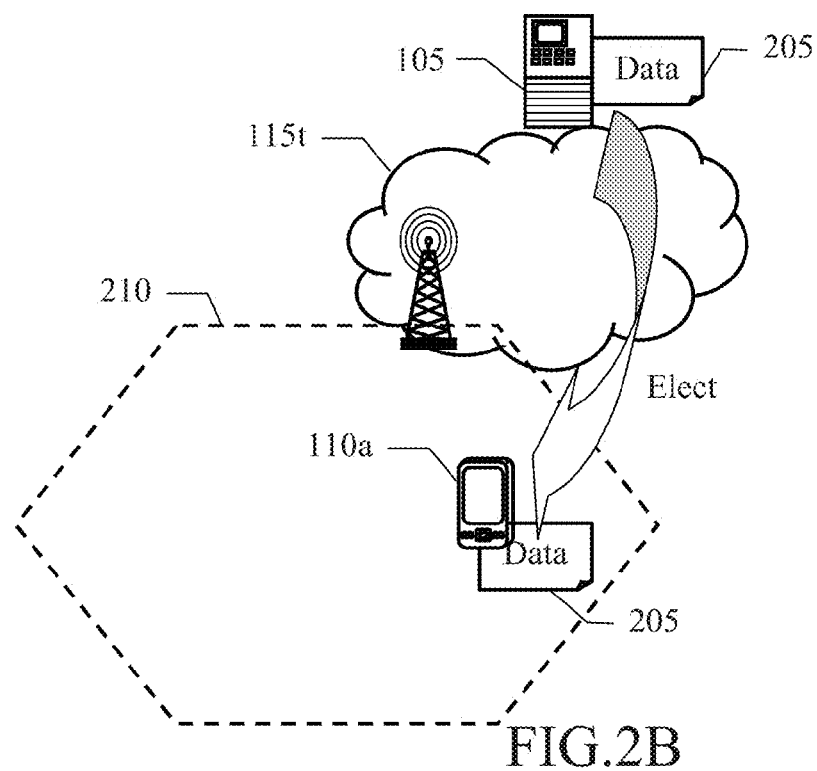

With reference now to the FIG. 2B, in the solution according to an embodiment of the invention, the mobile device 110a (wherein the management data 205 has already been downloaded, differentiated as inclusive mobile device) may also be elected as a service mobile device; the election is performed according to characteristic information of the inclusive mobile device 110a, which characteristic information is based at least on its current position (for example, when no other service mobile device exists in the telephone cell 210 of the inclusive mobile device 110a, as in the case at issue).

Other mobile devices in proximity of the service mobile device 110a may now be caused to download the management data 205 directly from it (instead of addressing the server 105).

Figure 2C:
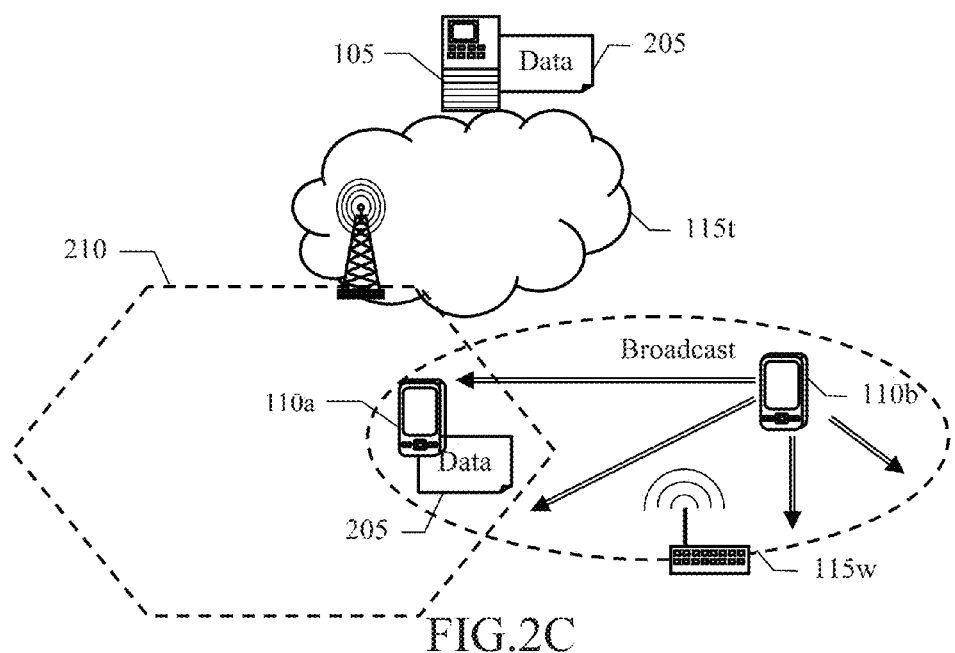

For example, as shown in the FIG. 2C, another mobile device (differentiated with the reference 110b) broadcasts a download request for the management data 205 through a Wi-Fi network which it is connected to (differentiated with the reference 115w).

Figure 2D:
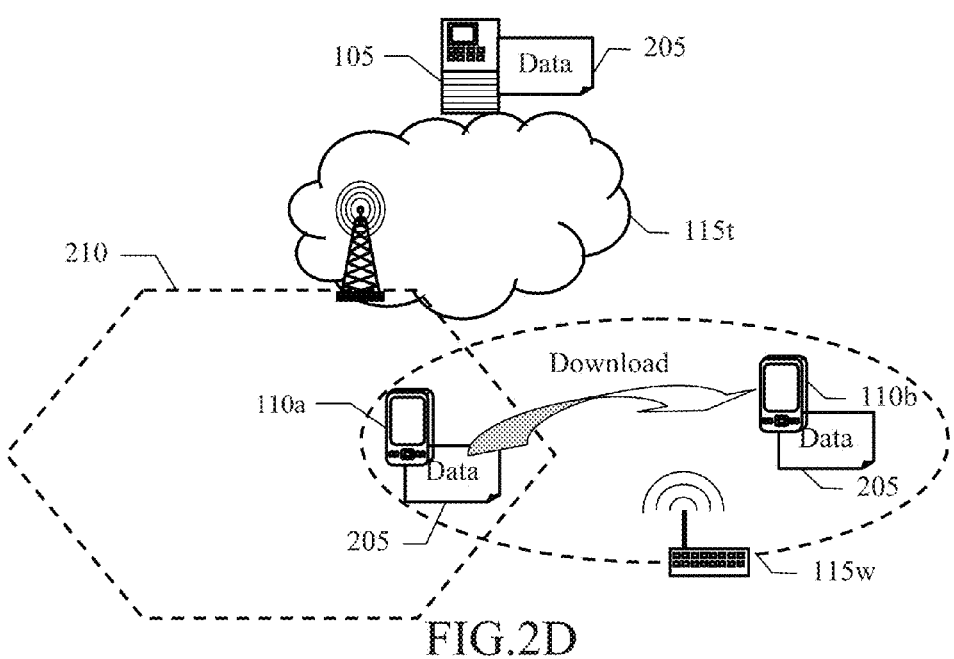

Moving to the FIG. 2D, assuming that the service mobile device 110a is connected to the Wi-Fi network 115w as well, it may serve the download request, so that the management data 205 is now downloaded directly from the service mobile device 110a onto the mobile device 110b.

Figure 2E:
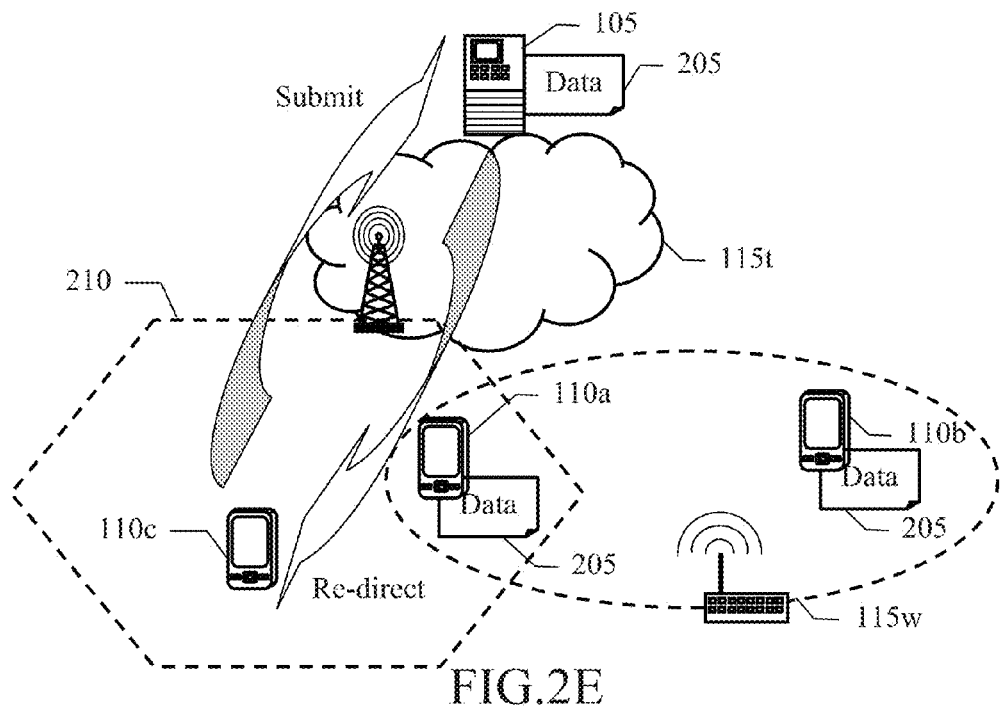

In addition or in the alternative, as shown in the FIG. 2E, another mobile device (differentiated with the reference 110c) submits a further download request for the management data 205 to the server 105 (through the telephone network 115t). In this case, assuming that the mobile device 110c is attached to the same telephone cell 210 of the service mobile device 110a, the server 105 re-directs the mobile device 110c to the service mobile device 110a (for example, by returning its address through the telephone network 115t).

Figure 2F:
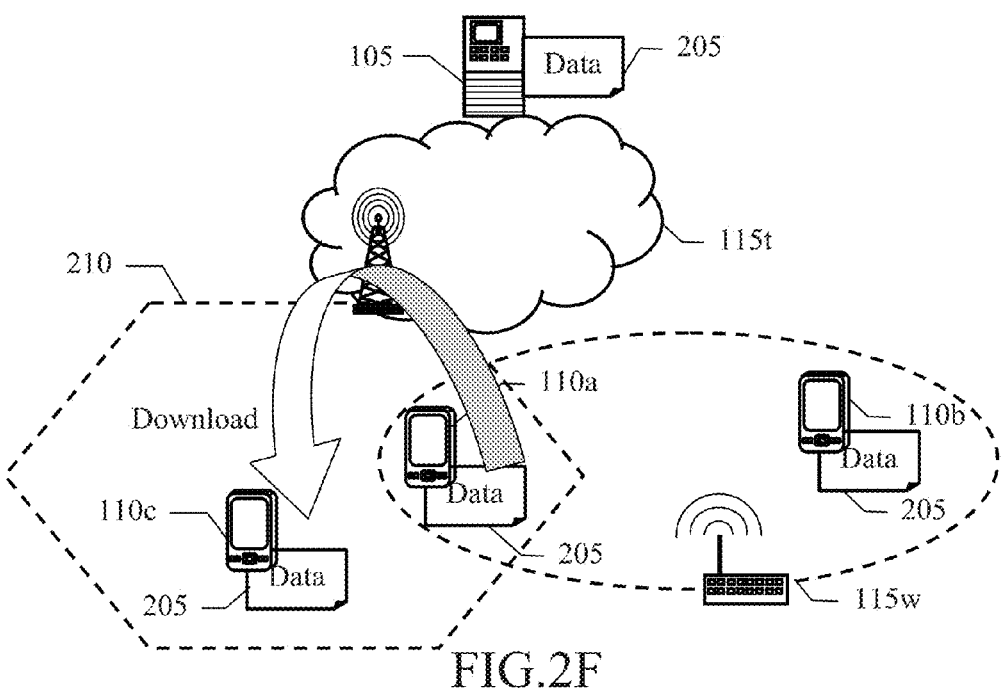

Moving to the FIG. 2F, in response thereto the mobile device 110c then downloads the management data 205 directly from the service mobile device 110a, which is accessed by means of its address (for example, again through the telephone network 115t).

The above-described solution leverages the mobile devices themselves for managing the other mobile devices that are in proximity thereto. In this way, the mobile devices co-operate in a peer-to-peer way, thereby limiting the overhead caused to the management server. As a result, scalability issues are strongly mitigated (so as to allow the application of the described solution even when the number of the mobile devices is very high).

Moreover, this solution exploits the nomadic behavior of the mobile devices at its own advantage. Indeed, the mobile devices are now used temporarily as relays and depots of the management data (for the other mobile devices in proximity thereto at the moment). This provides a very efficient deployment infrastructure, which self-adapts dynamically according to the current positions of the mobile devices (with a corresponding reduction of network traffic).

Figure 3:
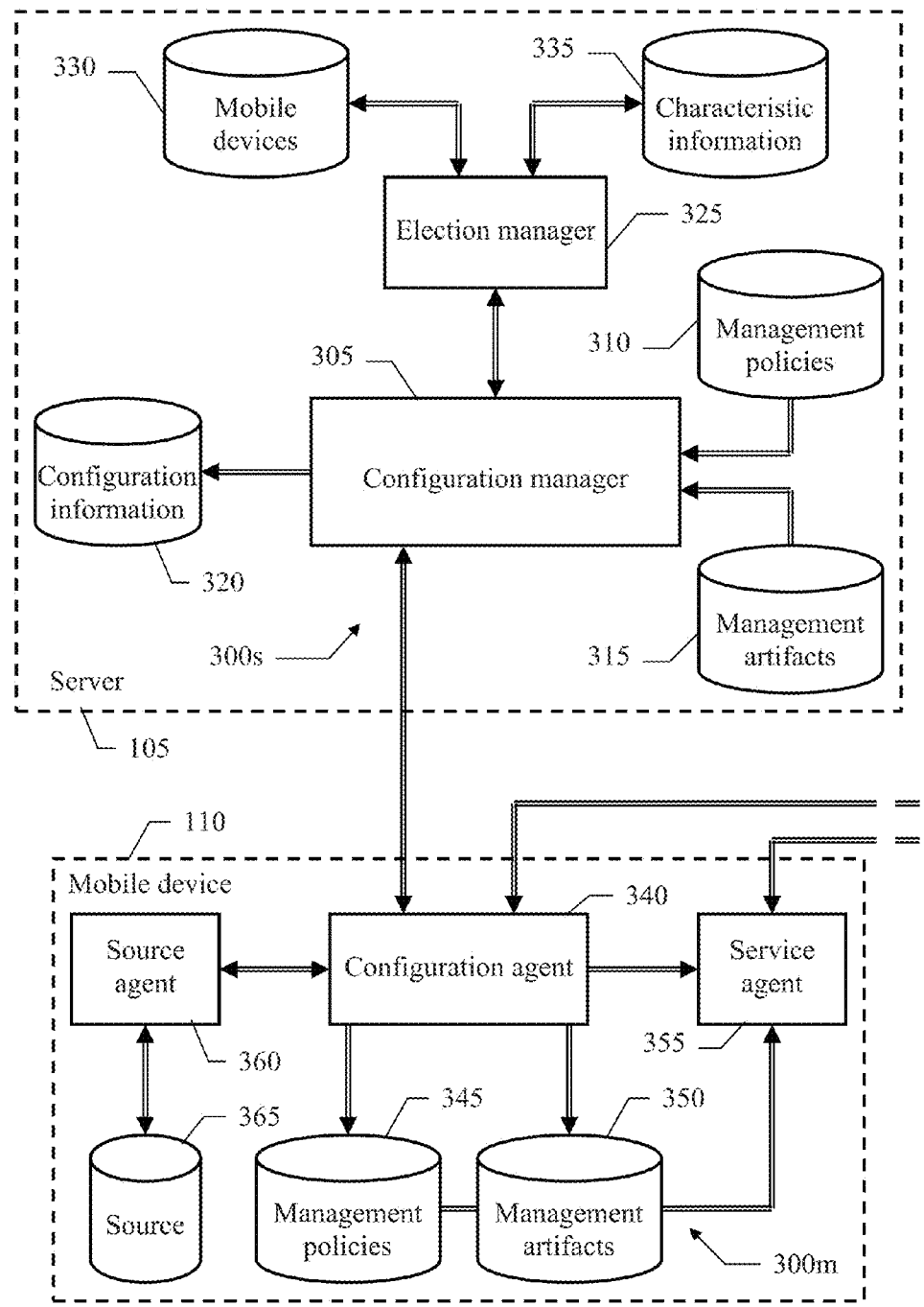
FIG. 3 shows the main software modules that may be used to implement the solution according to an embodiment of the invention.

The main software modules that may be used to implement the solution according to an embodiment of the invention are shown in the FIG. 3. These software modules are denoted as a whole with the reference 300s in the server 105 and with the reference 300m in each mobile device 110. The information (programs and data) is typically stored in the mass memories of the server 105 and of the mobile devices 110 and loaded (at least partially) into their working memories when the programs are running, together with an operating system and other application programs (not shown in the figure). The programs are initially installed onto the corresponding mass-memories, for example, from DVDs in the server 105 and from the Internet in the mobile devices 110.

With reference in particular to the server 105, a configuration manager 305 controls the management of the mobile devices 110. For this purpose, the configuration manager 305 accesses a repository that stores management policies 310 to be enforced on the mobile devices 110 (which management policies 310 are defined at a high-level independent of an actual implementation of the server 105 and of the mobile devices 110). Particularly, each management policy 310 defines one or more conditions, which are to be fulfilled by the mobile devices 110 to be compliant with the management policy 310, and one or more actions, which are to be executed on the mobile devices 110 to make them compliant with the management policy 310; for example, the management policy 310 may indicate the migration to a different operating system, the installation of a software product, the upgrade of a software product or a firmware, the removal of a software product, the application of a set of patches or a whole service pack, the implementation of one or more security rules, and the like. Generally, the enforcement of the management policies 310 on the mobile devices 110 involves the downloading and the application of one or more management artifacts 315, which are stored in a corresponding repository; for example, the management artifacts 315 may be software packages comprising the software product or the firmware to be installed or upgraded, the patches or the service pack to be applied, or the security rules to be implemented. The configuration manager 305 also controls a repository, which stores configuration information 320 of each mobile device 110; for example, the configuration information 320 indicates the management policies 310 that are to be enforced on the mobile device 110, and its actual compliance thereto.

In the solution according to an embodiment of the invention, the configuration manager 305 also interfaces with an election manager 325. The election manager 325 controls the election of the mobile devices 110 (which are inclusive mobile devices, i.e., storing the corresponding management policies and management artifacts referred to as whole as management data) as service mobile devices. For this purpose, the election manager 325 owns a repository that stores an indication of a current role 330 of each mobile device (i.e., whether the mobile device is an inclusive mobile device and whether it has been elected as a service mobile device). Moreover, the election manager 325 owns a repository that stores the characteristic information 335 of each mobile device 110. For example, the characteristic information 335 comprises, in addition to the current position of the mobile device, an indication of its free resources (such as processing power and memory space), available communication channels (such as type and performance), and election history (such as time elapsed since a previous election and time currently spent as service mobile device).

With reference now to a generic mobile device 110, a configuration agent 340 controls the enforcement of the relevant management policies thereon. Particularly, this comprises the downloading of the management policies, which are stored into a corresponding repository (where they are denoted with the reference 345), and their enforcement on the mobile device 110; in turn, this generally comprises the downloading of the associated management artifacts, which are stored into a corresponding repository (where they are denoted with the reference 350), and their application on the mobile device 110.

In the solution according to an embodiment of the invention, the configuration agent 340 also controls a service agent 355. Particularly, the configuration agent 340 enables or disables the service agent 355 when it has been elected or de-elected, respectively, as service mobile device by the server 105. The service agent 355 (when enabled) serves the download requests that are received from the other mobile devices (not shown in the figure); for this purpose, the service agent 355 extracts the requested management policies 345 and management artifacts 350 from the corresponding repositories.

Moreover, the configuration agent 340 interfaces with a source agent 360. The source agent 360 controls a table, which stores an indication of a source 365 that the mobile device 110 has to address for downloading the relevant management data (i.e., the server 105 or a service mobile device in proximity thereto, not shown in the figure); for example, the source 365 is identified by the communication channel to be used for communicating with it, and by its address in a connection that is implemented over it (such as an IP address in the Internet, a MAC address in a WLAN, or an AM address in a Bluetooth link). The source agent 360 controls the configuration agent 340 accordingly, so as to cause it to address the configuration manager 305 of the server 105 or the service agent of the corresponding service mobile device.

Figure 4A:
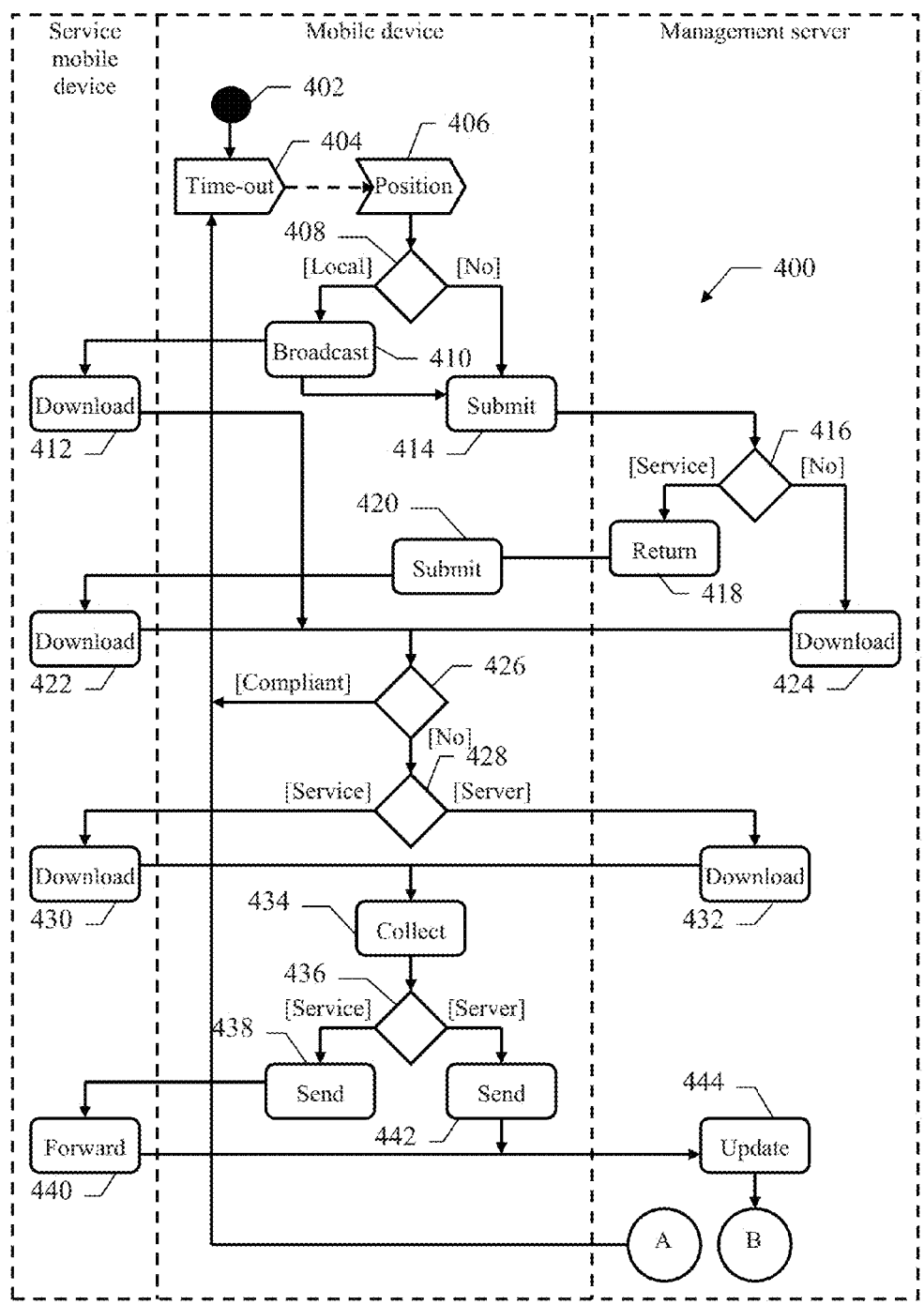
FIG. 4A-FIG. 4C show an activity diagram describing the flow of activities relating to an implementation of the solution according to an embodiment of the invention.
Figure 4B:
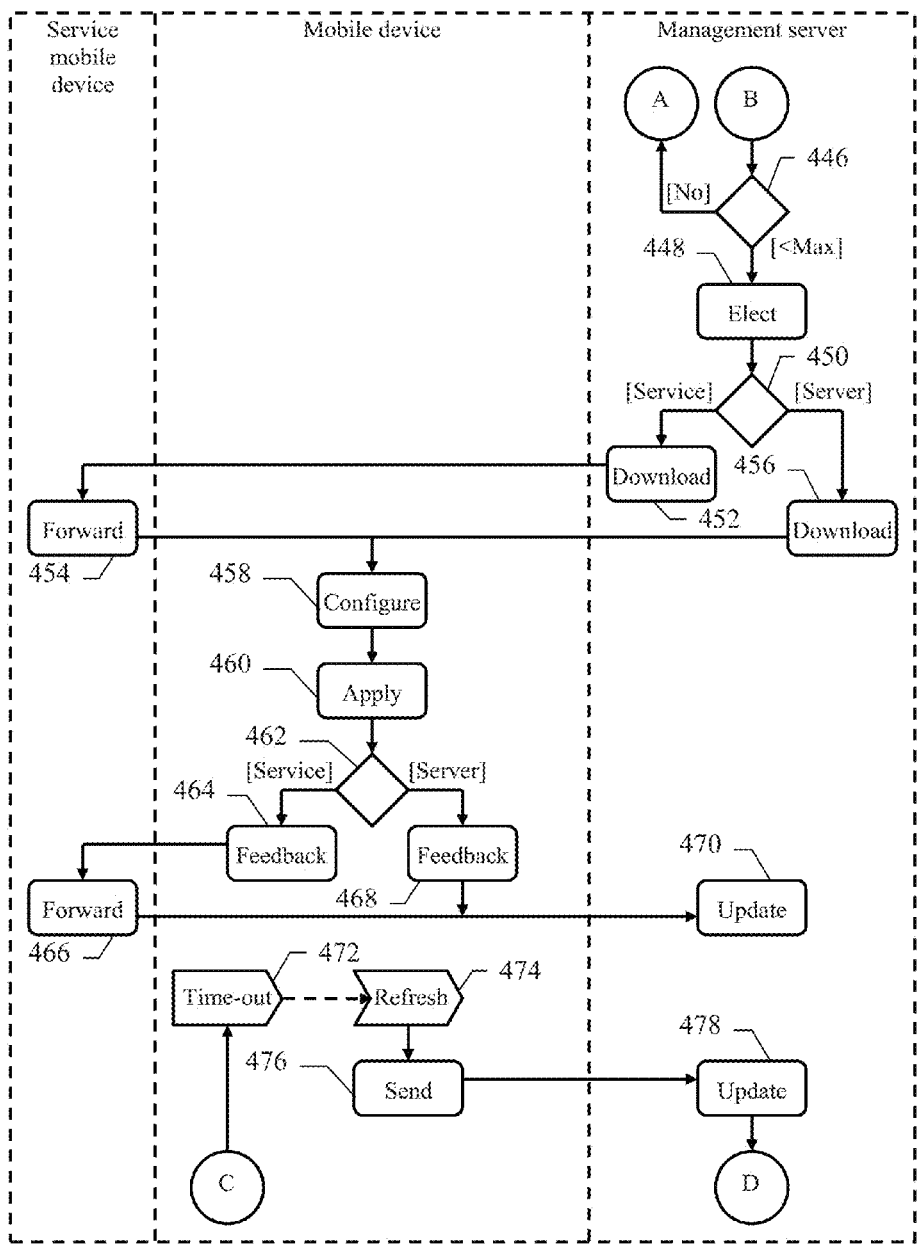
Figure 4C:
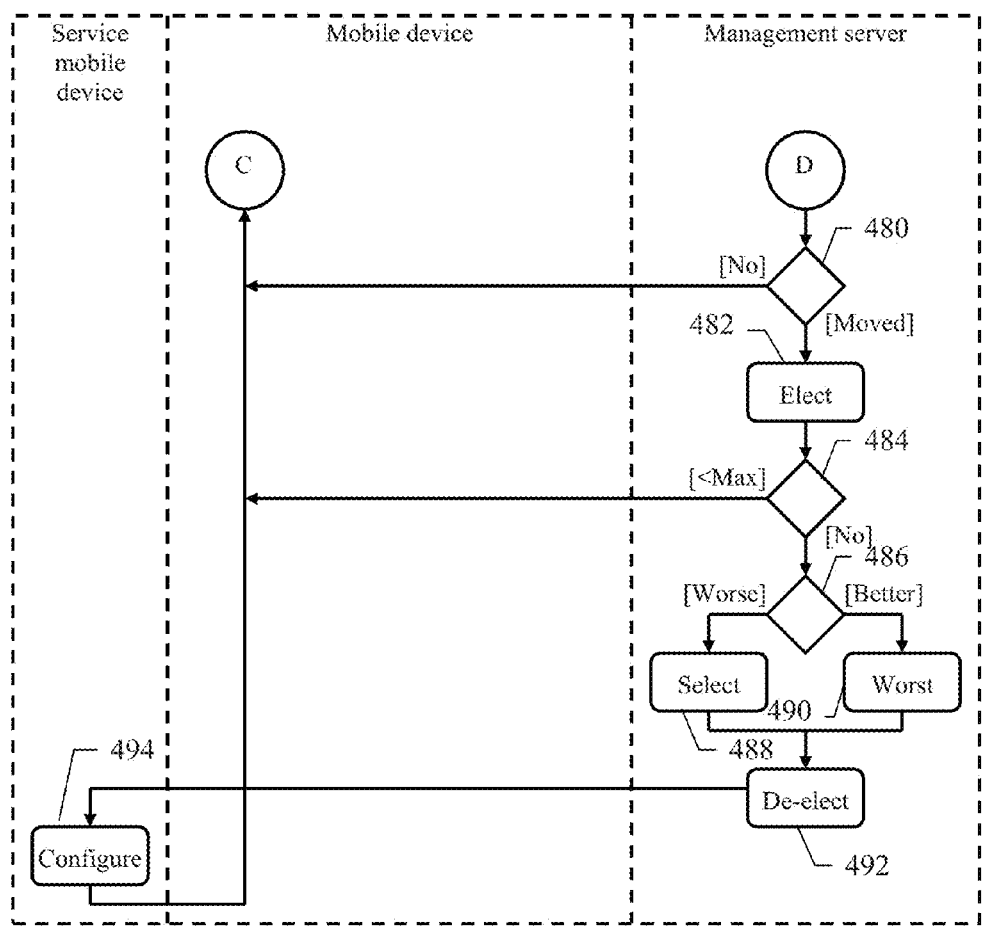

An activity diagram describing the flow of activities relating to an implementation of the solution according to an embodiment of the invention is shown in the FIG. 4A-FIG. 4C. In this respect, each block in the diagram may represent a module, segment, or portion of code, which comprises one or more executable instructions for implementing the specified logical function(s).

Particularly, the diagram represents an exemplary process that may be implemented in the above-described data processing system for managing the mobile devices with a method 400. The method begins at the black start circle 402 in the swim-lane of a generic mobile device, and then continues to block 404 wherein a time-out for verifying the compliance of the mobile device with its management policies is monitored. As soon as this time-out expires (for example, every 12-24 hours), the method passes to block 406, wherein the mobile device detects its position (for example, as defined by the telephone cell which is attached to).

The flow of activity then branches at block 408 according to the communication channels that are available at the moment for the mobile device.

If a (local) communication channel that may be used to communicate locally with other mobile devices is available (for example, of the Wi-Fi type), a download request, comprising an indication of the position of the mobile device, is broadcast through this local communication channel at block 410. When a service mobile device within a transmission range of the local communication channel (for example, as defined by a coverage of a corresponding Wi-Fi access point) receives the download request, the method continues to block 412 in its swim-lane. The service mobile device serves the download request, so that the relevant management policies are downloaded from the service mobile device onto the mobile device.

Referring back to the block 408, if no local communication channel is available (for example, because the mobile device only accesses the Internet through a telephone network), the method passes to block 414. The same point is also reached from the block 410 when no response is received after a pre-defined waiting time from the broadcast of the download request (for example, 10-30 sec.), meaning that no service mobile device is available within the transmission range of the local communication channel. In both cases, the same download request (comprising the indication of the position of the mobile device) is submitted to the management server. Continuing to block 416, the management server verifies whether one or more service mobile devices are available for the mobile device at its position (for example, in the same telephone cell and with an available communication channel that is shared with the mobile device). If so, at block 418 the management server selects one of them if necessary (for example, with a round-robin strategy), and in any case returns an indication of this service mobile device (i.e., address and communication channel to be used to communicate with it) to the mobile device. In response thereto, at block 420 the mobile device submits the same download request (comprising the indication of the position of the mobile device) to the address of this service mobile device through the shared communication channel (for example, in the Internet through the telephone network). The service mobile device (assumed to be the same as above for the sake of simplicity) receives the download request at block 422; the service mobile device likewise serves the download request, so that the relevant management policies are downloaded from the service mobile device onto the mobile device. Referring back to the block 416, if no service mobile device is available at the position of the mobile device, the relevant management policies are directly downloaded from the management server onto the mobile device at block 424.

The flow of activity then merges at block 426 in the swim-lane of the mobile device from the block 412, from the block 422 or from the block 424 (once the management policies have been downloaded from the service mobile device in the first two cases or from the management server in the last case). At this point, the mobile device verifies its compliance with the management policies. If the mobile device is already complaint with the management policies, the method returns to the block 404 waiting for a next expiration of the corresponding time-out. Conversely, the method descends into block 428. If the mobile device is engaged with the service mobile device, the required management artifacts are downloaded from the service mobile device onto the mobile device at block 430. Otherwise, if the mobile device is engaged with the management server, the required management artifacts are downloaded from the management server onto the mobile device at block 432.

In both cases, the method continues to block 434 (from either the block 430 or the block 432) wherein the mobile device collects metrics contributing to define the characteristic information thereof (in addition to its position)—for example, measuring its free resources and the performance of its available communication channels. The method then continues to block 436. If the mobile device is engaged with the service mobile device, this characteristic information is sent by the mobile device to the service mobile device at block 438. The service mobile device forwards the characteristic information (on behalf of the mobile device) to the management server at block 440. Otherwise, if the mobile device is engaged with the management server, the same characteristic information is sent directly by the mobile device to the management server at block 442.

In both cases, the method continues to block 444 (from either the block 440 or the block 442) wherein the management server updates its repositories accordingly (by setting the mobile device as inclusive mobile device and adding its characteristic information). With reference now to block 446, the management server verifies whether the mobile device (now inclusive mobile device) may be elected as service mobile device. For this purpose, different criteria may be used (at least based on the current position of the mobile device). For example, in an embodiment of the invention the mobile device is elected as service mobile device when the number of the service mobile devices attached to its telephone cell is lower than a maximum value. The maximum value may be set statically (to any value >=1); alternatively, the maximum number may be set dynamically, for example, according to the number of the mobile devices that are attached to the same telephone cell at the moment (such as equal to 10-20%). When the mobile device is not elected as service mobile device, the method returns to the block 404 waiting for a next expiration of the corresponding time-out. Conversely, the method descends into block 448; in this phase, the repository of the mobile devices is updated accordingly (to indicate that the mobile devise has been elected as service mobile device), and a corresponding service policy is created (for actually causing its election). The method then descends into block 450. If the mobile device is engaged with the (previous) service mobile device, the service policy is downloaded from the management server onto this service mobile device at block 452. The service mobile device forwards the service policy to the mobile device at block 454. Otherwise, if the mobile device is engaged with the management server, the service policy is downloaded directly from the management server onto the mobile device at block 456. In both cases, the method continues to block 458 in the swim-lane of the mobile device (from either the block 454 or the block 456); in this phase, the mobile device enforces the service policy, which configures it as service mobile device.

With reference now to block 460, the management artifacts are applied on the mobile device. The method then passes to block 462. If the mobile device is engaged with the (previous) service mobile device, a feedback of the enforcement of the management policies on the mobile device is returned to the service mobile device at block 464. The service mobile device forwards this feedback (on behalf of the mobile device) to the management server at block 466. Otherwise, if the mobile device is engaged with the management server, the feedback is returned directly to the management server at block 468. In both cases, the method continues to block 470 in the swim-lane of the management server (from either the block 466 or the block 468); in this phase, the repository of the configuration information is updated accordingly.

In a completely asynchronous way, the method passes from block 472 to block 474 as soon as another time-out expires (for example, every 1-5 min.) on each mobile device (only one taken into account in the figure for the sake of simplicity). In response thereto, the mobile device refreshes its characteristic information (comprising the position thereof). The mobile device then sends its characteristic information to the management server at block 476. In response thereto, at block 478 the management server updates the corresponding repository accordingly.

The management server then verifies at block 480 whether the mobile device is a service mobile device that has moved to a new telephone cell from its (previous) telephone cell, with respect to a last refresh of the characteristic information thereof. If not, the method returns to the block 472 waiting for a next expiration of the corresponding time-out. Conversely, the method descends into block 482, wherein the management server elects another inclusive mobile device attached to the previous telephone cell, if any, as (new) service mobile device in place of this (old) service mobile device (by repeating the same operations described above). The selection of the eligible mobile device to be elected as new service mobile device may be based on different criteria; for example, in an embodiment of the invention the selection is based on an index of each inclusive mobile device, which index is calculated as a weighted sum of some metrics defining its characteristic information (for example, to balance the amount of free resources, the performance of the available communication channels, and the time elapsed since the previous election). A test is now made at block 484 to determine whether the number of the service mobile devices in the new telephone cell is lower than the corresponding maximum value. If so, the mobile device may continue to operate as service mobile device in the new telephone cell as well, so that the method again returns to the block 472. Conversely, the method descends into block 486, wherein the management server compares the mobile device with the other service mobile devices of the new telephone cell according to their characteristic information (for example, by calculating another similar index based on the amount of free resources, the performance of the available communication channels, and the time spent as service mobile device). If the mobile device is worse than all the service mobile devices of the new telephone cell, it is selected to be de-elected at block 488. Conversely, if the mobile device is better than one or more of these service mobile devices, the worst of them is selected to be de-elected at block 490. In both cases, a corresponding service policy is created and sent to the service mobile device to be de-elected at block 492 (for example, the previous service mobile device in the example at issue). Moving to the swim-lane of this service mobile device at block 494, the service policy is enforced thereon, so as to configure it no longer as service mobile device. The method then returns to the block 472 to repeat the same operations continually.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the present invention provides a method for managing a plurality of data processing mobile devices. The method comprises the step of downloading management data onto each one of the mobile devices for application thereof on the mobile device; for at least a first one of the mobile devices the management data is downloaded from a data processing central system. Each mobile device wherein the management data has already been downloaded defines an inclusive mobile device. In the solution according to an embodiment of the invention, the step of downloading management data comprises the following operations. A set of (one or more) inclusive mobile devices is elected temporarily as service mobile devices according to characteristic information of the inclusive mobile devices, which is based at least on a current position thereof. At least a second one of the mobile devices is caused to download the management data from a selected one of the service mobile devices in proximity thereof.

However, the mobile devices and/or the central system may be of any type (see below) and in any number, and the management data may be of any type (for example, only the management artifacts); moreover, the downloading of the management data may be controlled in any way (for example, with the management policies that are enforced by the management server, or with the management of the mobile device that is controlled according to their current configuration stored in the management server, without the use of any management policies). The position of the mobile devices may be defined in any way (for example, by an identifier of corresponding Wi-Fi access points or by their GPS coordinates), and it may be detected in any way (for example, directly by the management server through telecommunications company carriers). In any case, the election of the service mobile devices and the downloading of the management data from the service mobile devices may be performed in any way (see below).

In an embodiment of the invention, the characteristic information of each inclusive mobile device is further based on an indication of free resources of the inclusive mobile device, of communication channels being available to the inclusive mobile device, and/or of a history of the election of the inclusive mobile device as service mobile device.

However, the characteristic information of each inclusive mobile device may be based on different, additional or alternative metrics (for example, a number of mobile devices currently served), down to its position alone.

In an embodiment of the invention, the step of electing a set of inclusive mobile devices temporarily as service mobile devices comprises electing each inclusive mobile device as service mobile device when a number of the service mobile devices within a geographical cell of the inclusive mobile device comprising the current position thereof is lower than a maximum value.

However, the geographical cell may be defined in any way (for example, by a coverage of the Wi-Fi access point or by a pre-defined range around the GPS position of the inclusive mobile device). In any case, the election of the service mobile devices may be based on different, additional or alternative criteria (for example, by limiting the selection to the inclusive mobile devices that have at least one local communication channel available, by ensuring a minimum resting period between consecutive elections of the same eligible mobile device, and the like). Moreover, the election may be controlled by the management server (as described above) or by the mobile devices themselves.

In an embodiment of the invention, the method further comprises the steps of determining a number of the mobile devices within the geographical cell of the inclusive mobile device, and setting the maximum value according to the number of the mobile devices within the geographical cell of the inclusive mobile device.

However, the maximum number may be set in any way, either dynamically (for example, by only taking into account the mobile devices that are not complaint with the corresponding management policies) or statically (for example, either individually for each geographical cell or globally for all of them, according to historical information).

In an embodiment of the invention, the step of electing a set of the inclusive mobile devices temporarily as service mobile devices comprises monitoring the characteristic information of each service mobile device, and updating the election of the service mobile devices according to the characteristic information.

However, the characteristic information may be monitored in any way (for example, directly by the management server); moreover, the monitoring may relate to any metrics defining the characteristic information (down to the position of the inclusive mobile devices only). In any case, the election of the service mobile device may be updated in any way (see below). Moreover, it is possible to implement switching algorithms for engaging each mobile device with another service mobile device (or with the management server) when the corresponding service mobile device becomes unavailable (for example, because it is de-elected or the two mobile devices move away).

In an embodiment of the invention, the step of updating the election of the service mobile devices comprises de-electing each old one of the service mobile devices when the old service mobile device is in proximity of a better service mobile device being better than the old service mobile device according to a comparison of the corresponding characteristic information.

However, the characteristic information of the different service mobile devices may be compared in any way (for example, only according to the time elapsed since their election); in any case, the service mobile devices may also be de-elected automatically (for example, after a pre-determined period from their election).

In an embodiment of the invention, the step of updating the election of the service mobile devices further comprises electing a new one of the inclusive mobile devices as service mobile device in place of the old service mobile device.

However, the election of the new service device may be based on any criteria (for example, simply on a round-robin algorithm), or it may be omitted at all.

In an embodiment of the invention, the step of de-electing each old one of the service mobile devices comprises de-electing the old service mobile device when the old service mobile device enters the geographical cell of the better service mobile device with the number of the service mobile devices within the geographical cell of the better service mobile device equal to the maximum value or when the better service mobile device enters the geographical cell of the old service mobile device with the number of the service mobile devices within the geographical cell of the old service mobile device equal to the maximum value; the step of electing a new one of the inclusive mobile devices as service mobile device comprises selecting the new inclusive mobile device among the inclusive mobile devices within the geographical cell of the old service mobile device.

However, the service mobile devices may be controlled in any way (for example, by always de-electing the service mobile device that moves to another geographical cell).

In an embodiment of the invention, the step of causing at least a second one of the mobile devices to download the management data from a selected one of the service mobile devices in proximity thereof comprises broadcasting a download request for the management data by the second mobile device, and downloading the management data from one of the service mobile devices serving the download request onto the second mobile device.

However, this local association between the second mobile device and the service mobile device may be performed in any way (for example, in a hybrid manner wherein the second mobile device at first engages the management server to receive an indication of the selected service mobile device, and then it engages the selected service mobile device locally).

In an embodiment of the invention, the step of causing at least a second one of the mobile devices to download the management data from a selected one of the service mobile devices in proximity thereof comprises receiving a further download request for the management data by the management system from the second mobile device, and returning an indication of the selected service mobile device from the management system to the second mobile device to cause the second mobile device to submit the further download request to the selected service mobile device.

However, the management server may select the service mobile device to be associated with the second mobile device in any way (for example, by selecting the best one in the geographical cell of the second mobile device according to its characteristic information). In any case, the association between each second mobile device and the corresponding service mobile device may be performed entirely locally, entirely under the control of the management server, or with a combination thereof.

In an embodiment of the invention, the method further comprises the following steps. A first feedback indicative of a result of the application of the management data on each first mobile device is returned from the first mobile device to the management system. A second feedback indicative of a result of the application of the management data on each second mobile device is returned from the second mobile device to the corresponding selected service mobile device; each second feedback is then forwarded from the corresponding selected service mobile device to the management system.

However, the feedback may comprise different, additional or alternative information. Moreover, the feedback may be returned directly to the management server in any case, or this feature may be omitted at all.

In general, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the present invention provides a computer program, which comprising code means for causing a data processing system to perform the steps of the above-described method when the computer program is executed on the data processing system.

However, this program may be implemented as a stand-alone module, as a plug-in for a resource management tool, or directly in the resource management tool itself (running either entirely on the management server or distributed in part on it an in part on each mobile device).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the present invention provides a system, which comprises means configured for performing the steps of the same method.

However, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. Moreover, the method may also be carried out on a system based on a different architecture (for example, a local, wide area, cellular or satellite network), and exploiting any type of (wired and/or wireless) connections. In any case, each computer (i.e., the management server and the mobile devices) may have another structure or may comprise similar elements (such as cache memories temporarily storing the programs or parts thereof), and it may be replaced with any code execution entity; particularly, the management server may be based on a physical machine, a virtual machine, or a combination of multiple entities (such as a multi-tier architecture, a grid computing infrastructure, and the like).

The invention claimed is:

1. A computer program product for managing mobile devices, the computer program product comprising a non-transitory computer-readable recording medium having recorded thereon a computer program comprising program code that causes a data processing system to perform, when the computer program is executed on the data processing system, the steps of:

forming a plurality of inclusive mobile devices by downloading management data comprising executable software code onto each one of a plurality of selected mobile devices and running the executable software code on the selected mobile devices, by:
causing at least a first mobile device of the plurality of selected mobile devices to become at least one of the plurality of inclusive mobile devices, by:
broadcasting a download request for the management data by the first mobile device;
determining that no service mobile device is available to provide the management data to the first mobile device;
downloading the management data from the data processing system to the first mobile device; and
running the executable software code on the first mobile device;
electing a set of one or more of the plurality of inclusive mobile devices as a set of one or more service mobile devices according to characteristic information of the plurality of inclusive mobile devices that is based at least on a current position thereof, wherein the set of one or more service mobile devices are configured to download the management data to other mobile devices; and
causing at least a second mobile device to become an inclusive mobile device, by:
broadcasting a download request for the management data by the second mobile device;
selecting at least one of the elected service mobile devices based on proximity to the second mobile device in accordance with the characteristic information;
downloading the management data from the selected at least one service mobile device; and
running the executable software code on the second mobile device.

2. A system for managing mobile devices, the system comprising a data processor and a memory having program code stored therein that is configured to perform, when executed by the data processor, the steps of:
forming a plurality of inclusive mobile devices by downloading management data comprising executable software code onto each one of a plurality of selected mobile devices and running the executable software code on the selected mobile devices, by:
causing at least a first mobile device of the plurality of selected mobile devices to become at least one of the plurality of inclusive mobile devices, by:
broadcasting a download request for the management data by the first mobile device;
determining that no service mobile device is available to provide the management data to the first mobile device;
downloading the management data from the data processing system to the first mobile device; and
running the executable software code on the first mobile device;
electing a set of one or more of the plurality of inclusive mobile devices as a set of one or more service mobile devices according to characteristic information of the plurality of inclusive mobile devices that is based at least on a current position thereof, wherein the set of one or more service mobile devices are configured to download the management data to other mobile devices; and
causing at least a second mobile device to become an inclusive mobile device, by:
broadcasting a download request for the management data by the second mobile device;
selecting at least one of the elected service mobile devices based on proximity to the second mobile device in accordance with the characteristic information;
downloading the management data from the selected at least one service mobile device; and
running the executable software code on the second mobile device.

3. The system according to claim 2, wherein the characteristic information is further based on at least one of an indication of free resources of at least one of the inclusive mobile devices, of communication channels being available to the at least one of the inclusive mobile devices, and a history of the election of the at least one of the inclusive mobile devices as a service mobile device.

4. The system according to claim 2, wherein the step of electing a set of one or more inclusive mobile devices comprises:
electing each inclusive mobile device as a service mobile device when a number of the service mobile devices within a geographical cell of the inclusive mobile device comprising the current position thereof is lower than a maximum value.

5. The system according to claim 4, further comprising the steps of:
determining a number of the mobile devices within the geographical cell of the inclusive mobile device, and
setting the maximum value according to the number of the mobile devices within the geographical cell of the inclusive mobile device.

6. The system according to claim 2, wherein the step of electing a set of one or more of the inclusive mobile devices comprises:
monitoring the characteristic information of each service mobile device; and
updating the election of the service mobile devices according to the characteristic information.

7. The system according to claim 6, wherein the step of updating the election of the service mobile devices comprises:
de-electing each old one of the service mobile devices when the old service mobile device is in proximity of a better service mobile device being better than the old service mobile device according to a comparison of the corresponding characteristic information.

8. The system according to claim 7, wherein the step of updating the election of the service mobile devices further comprises:
electing a new one of the inclusive mobile devices as the service mobile device in place of the old service mobile device.

9. The system according to claim 8, wherein the step of de-electing each old one of the service mobile devices comprises:
de-electing the old service mobile device when the old service mobile device enters the geographical cell of the better service mobile device with the number of the service mobile devices within the geographical cell of the better service mobile device equal to the maximum value or when the better service mobile device enters the geographical cell of the old service mobile device with the number of the service mobile devices within the geographical cell of the old service mobile device equal to the maximum value; and
wherein the step of electing a new one of the inclusive mobile devices as service mobile device comprises selecting the new inclusive mobile device among the inclusive mobile devices within the geographical cell of the old service mobile device.

10. The system according to claim 2, wherein the step of causing at least a second one of the mobile devices to download the management data from a selected one of the service mobile devices in proximity thereof comprises:
receiving a further download request for the management data by the data processing central system from the second mobile device; and
returning an indication of the selected service mobile device from the data processing central system to the second mobile device to cause the second mobile device to submit the further download request to the selected service mobile device.

11. The system according to claim 2, further comprising the steps of:
returning a first feedback indicative of a result of the application of the management data on each first mobile device from the first mobile device to the data processing central system;
returning a second feedback indicative of a result of the application of the management data on each second mobile device from the second mobile device to the selected service mobile device; and
forwarding each second feedback from the selected service mobile device to the data processing central system.

12. The system according to claim 2, wherein the management data is downloaded from the data processing central system to the first mobile device using a telephone network, and the management data is downloaded from the selected service mobile device using a WiFi network.

13. The system according to claim 12, wherein the management data is downloaded from the data processing central system to the first mobile device responsive to receiving a download request for the management data from the first mobile device, wherein the download request includes the current position of the first mobile device.

14. The system according to claim 13, wherein the current position of the first mobile device is used to determine by the data processing central system whether other service mobile devices exist in a same mobile telephone cell of the telephone network as the first mobile device.

15. The system according to claim 14, wherein the step of causing at least a second one of the mobile devices to download the management data from a selected one of the service mobile devices in proximity thereof comprises:
receiving, by the data processing central system via the telephone network, a further download request for the management data from the second mobile device;
responsive to determining that the second mobile device is operatively coupled to the same mobile telephone cell of the telephone network that the first mobile device is operatively coupled to, re-directing the second mobile device to the selected service mobile device.

16. The system according to claim 15, wherein the re-directing comprises:
sending, by the data processing central system to the second mobile device, an address of the selected service mobile device to cause the second mobile device to request the management data from the selected service mobile device using the mobile telephone cell.

17. The system according to claim 2, wherein the management data comprises management policies and management artifacts, wherein the management policies define at least one condition to be fulfilled by the mobile devices and at least one action which is to be executed by the mobile devices to make them compliant with the management policies, and the management artifacts comprise at least one software package or patch to be installed on the mobile devices.

18. The system according to claim 2, wherein the data processing central system maintains a storage repository comprising a current role for each of the mobile devices that indicates whether each of the mobile devices is an inclusive mobile device or an elected service mobile device.

19. The system according to claim 2, further comprising:
responsive to a given one of the mobile devices receiving the management data, determining whether the given one of the mobile devices is compliant with management policies defined by the management data; and
responsive to determining that the given one of the mobile devices is not compliant with the management policies, downloading management artifacts to the given one of the mobile devices that are required for the given mobile device to be compliant with the management policies.

20. The system according to claim 2, wherein the download request for the management data that is broadcast by the second mobile device comprises an indication of a position of the second mobile device.

21. The system according to claim 2, wherein if a local communication channel is available for communicating locally with another mobile device, the download request for the management data is broadcast by the second mobile device using the local communication channel, otherwise the download request for the management data is submitted by the second mobile device to the data processing central system using a telephonic network.

* * * * *